(12) United States Patent
Strat

(10) Patent No.: US 9,507,987 B1
(45) Date of Patent: Nov. 29, 2016

(54) ARRANGEMENT FOR AND METHOD OF ILLUMINATING A TARGET TO BE ELECTRO-OPTICALLY READ BY IMAGE CAPTURE WITH INTERCHANGEABLE ILLUMINATION MODULES

(71) Applicant: SYMBOL TECHNOLOGIES, LLC, Lincolnshire, IL (US)

(72) Inventor: Askold Strat, Sound Beach, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/793,180

(22) Filed: Jul. 7, 2015

(51) Int. Cl.
  *G06K 7/10* (2006.01)
  *G06K 7/14* (2006.01)

(52) U.S. Cl.
  CPC ......... *G06K 7/10732* (2013.01); *G06K 7/1413* (2013.01); *G06K 7/1417* (2013.01)

(58) Field of Classification Search
  USPC ....... 235/462.01–472.03, 383, 385, 454, 455
  See application file for complete search history.

(56) References Cited

U.S. PATENT DOCUMENTS

| | | | | |
|---|---|---|---|---|
| 5,414,481 A * | 5/1995 | Fujioka | ............... | G03B 21/132 353/122 |
| 8,061,610 B2 * | 11/2011 | Nunnink | ............ | G06K 7/10732 235/454 |
| 2003/0089776 A1 * | 5/2003 | Hennick | ............ | G06K 7/10732 235/454 |
| 2006/0131419 A1 * | 6/2006 | Nunnink | ............ | G06K 7/10732 235/472.02 |
| 2007/0091332 A1 * | 4/2007 | Nunnink | ............ | G06K 7/10732 358/1.6 |
| 2007/0108284 A1 * | 5/2007 | Pankow | ............ | G06K 7/10851 235/454 |
| 2007/0119949 A1 * | 5/2007 | Hattersley | ............... | G06K 7/10 235/472.01 |
| 2008/0006699 A1 * | 1/2008 | Hattersley | .......... | G06K 7/10881 235/472.01 |
| 2012/0150589 A1 * | 6/2012 | Xian | ................... | G06K 7/10128 705/7.42 |
| 2016/0026838 A1 * | 1/2016 | Gillet | ................... | G02B 26/101 235/462.21 |

* cited by examiner

*Primary Examiner* — Tuyen K Vo

(57) ABSTRACT

Interchangeable illumination modules having different optical characteristics illuminate a target to be electro-optically read by image capture. Each module includes an illuminating light source for emitting illuminating light, and a support for supporting the illuminating light source for joint movement as a discrete unit from a removed position away from a reader to a mounted position on the reader. The support is accessible exteriorly of the reader in the mounted position. Electrical contacts mounted on the support are exposed exteriorly of the support for supplying an illumination control signal from the reader to the illuminating light source to energize the illuminating light source in the mounted position.

14 Claims, 5 Drawing Sheets

ARRANGEMENT FOR AND METHOD OF ILLUMINATING A TARGET TO BE ELECTRO-OPTICALLY READ BY IMAGE CAPTURE WITH INTERCHANGEABLE ILLUMINATION MODULES

BACKGROUND OF THE INVENTION

The present disclosure relates generally to an arrangement for, and a method of, illuminating and electro-optically reading a target by image capture, and, more particularly, to interchangeable illumination modules that are replaceably mounted on an imaging reader.

Solid-state imaging systems or imaging readers have been used, in both handheld and/or hands-free modes of operation, in many industries, such as retail, manufacturing, warehousing, distribution, postal, transportation, logistics, etc., to image various targets, such as one- and two-dimensional bar code symbols to be electro-optically decoded and read by image capture, and direct part marking (DPM) targets, e.g., machine-readable, high-density, one- or two-dimensional, optical codes, each DPM code being comprised of multiple elements that are directly marked (imprinted, etched, molded, or dot-peened) on a metal, plastic, leather, or glass, etc., workpiece. A known imaging reader included a scan module or engine mounted in a housing. The scan module included a solid-state imager, e.g., a one- or two-dimensional charge coupled device (CCD) or a complementary metal oxide semiconductor (CMOS) device, having a sensor array of photocells or light sensors that correspond to image elements or pixels over a field of view of the imager, and associated circuits for producing and processing electrical signals that are processed by a programmed microprocessor or controller into data indicative of the target being decoded and read. The scan module also included an illuminating light assembly for illuminating the target, and an imaging lens assembly for capturing return light scattered and/or reflected from the illuminated target, and for projecting the captured return light onto the sensor array to capture an image of the illuminated target.

Although generally satisfactory for its intended purpose, the known illuminating light assembly emitted illuminating light having fixed optical characteristics, e.g., a predetermined color (wavelength), a predetermined brightness (intensity), a predetermined illuminating light pattern distribution (directionality), a predetermined illumination angle (wide or narrow illumination field), a predetermined property (diffused or non-diffused light), etc. Such optical characteristics, however, were not ideal for different targets in all intended applications. For example, if the target was a bar code symbol that was colored black and printed on a background that was colored green, then an illuminating light that was colored red would be absorbed by both the black and green colors, thereby providing poor contrast between the symbol and the background, and resulting in a sluggish, poor reading performance for the reader. As another example, a typical DPM target was better read with diffused light, rather than non-diffused, specular light. Changing the optical characteristics was not considered practical due to the tight integration between the illuminating light assembly and the other assemblies in the scan module.

Accordingly, it would be desirable to change the optical characteristics of the illuminating light assembly in a simple, easy and rapid manner so that different targets in many different intended applications can be read with an improved reading performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
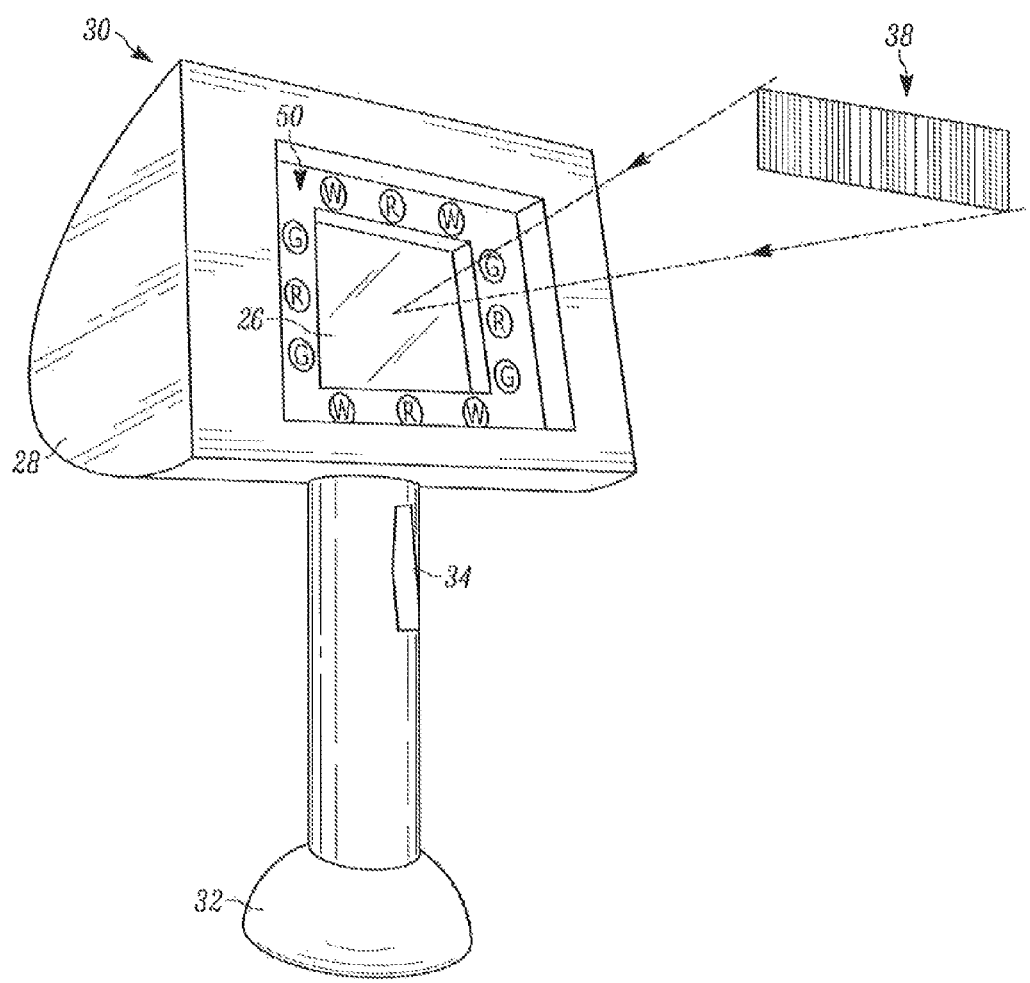
FIG. 1 is a perspective view of an imaging reader operative for illuminating and electro-optically reading a target by image capture in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, an illumination module is provided for illuminating a target, e.g., a bar code symbol or a DPM target, to be electro-optically imaged and read by an imaging reader. The illumination module includes an energizable illuminating light source for emitting illuminating light when energized, and a support for supporting the illuminating light source for joint movement as a discrete unit from a removed position away from the reader to a mounted position on the reader. The support is accessible exteriorly of the reader in the mounted position. The illumination module also includes a plurality of electrical contacts on the support and exposed exteriorly of the support for supplying an electrical illumination control signal from the reader to the illuminating light source to energize the illuminating light source in the mounted position.

In accordance with another feature of this disclosure, an arrangement for illuminating and electro-optically reading a target by image capture, includes a housing bounding an interior, an imaging assembly in the housing interior for imaging the target, a controller in the housing interior for controlling the imaging assembly and for generating an electrical illumination control signal, and the above-described illumination module for illuminating the target.

In one embodiment, the illuminating light source includes at least one light emitting diode (LED), and preferably a plurality of LEDs, for emitting the illuminating light with a selected optical characteristic. In another embodiment, the illuminating light source includes a plurality of different types of LEDs for emitting the illuminating light with different selected optical characteristics, one optical characteristic for each type, and the controller generates a plurality of electrical illumination control signals, one control signal for each type. In a preferred embodiment, another illumination module is provided for interchanging with the first-mentioned module. The other illumination module includes another energizable illuminating light source for emitting another illuminating light of a different optical characteristic than the first-mentioned illuminating light when energized. Thus, the optical characteristics of the illuminating light can be changed in a simple, easy and rapid manner by merely replacing one illumination module with another illumination module so that different targets in many different intended applications can be read with an improved reading performance.

In accordance with still another feature of this disclosure, a method of illuminating and electro-optically reading a target by image capture, is performed by mounting an imaging assembly for imaging the target in an interior of a housing, by configuring an illumination module as a discrete unit by jointly mounting an energizable illuminating light source on a support, and by moving the illumination module from a removed position away from the housing to a mounted position on the housing. The support is accessible exteriorly of the housing in the mounted position. The method is further performed by exposing a plurality of electrical contacts exteriorly of the support, and by energizing the illuminating light source in the mounted position via the exposed electrical contacts to illuminate the target with illuminating light.

Turning now to the drawings, reference numeral 30 in FIG. 1 generally identifies an imaging reader having a light-transmissive window 26 and a housing 28 supported by a base 32 for supporting the imaging reader 30 on a countertop or like support surface. The imaging reader 30 can thus be used in a hands-free mode as a stationary workstation in which products bearing, or associated with, targets are slid or swiped past, or presented to, the window 26, or can be picked up off the countertop and held in an operator's hand and used in a handheld mode in which the reader is moved, and a trigger 34 is manually depressed to initiate imaging of a target 38, especially one- or two-dimensional symbols, to be read at a working distance from the window 26. It will be understood that housings of configurations other than that illustrated can be employed. For example, the housing 28 can be configured as a gun-shaped, handheld scanner, or as a vertical slot scanner having a generally vertically arranged, upright window, or as a flat-bed or horizontal slot scanner having a generally horizontally arranged window, or as a bi-optical, dual window scanner having both generally horizontally and vertically arranged windows.

Figure 2:
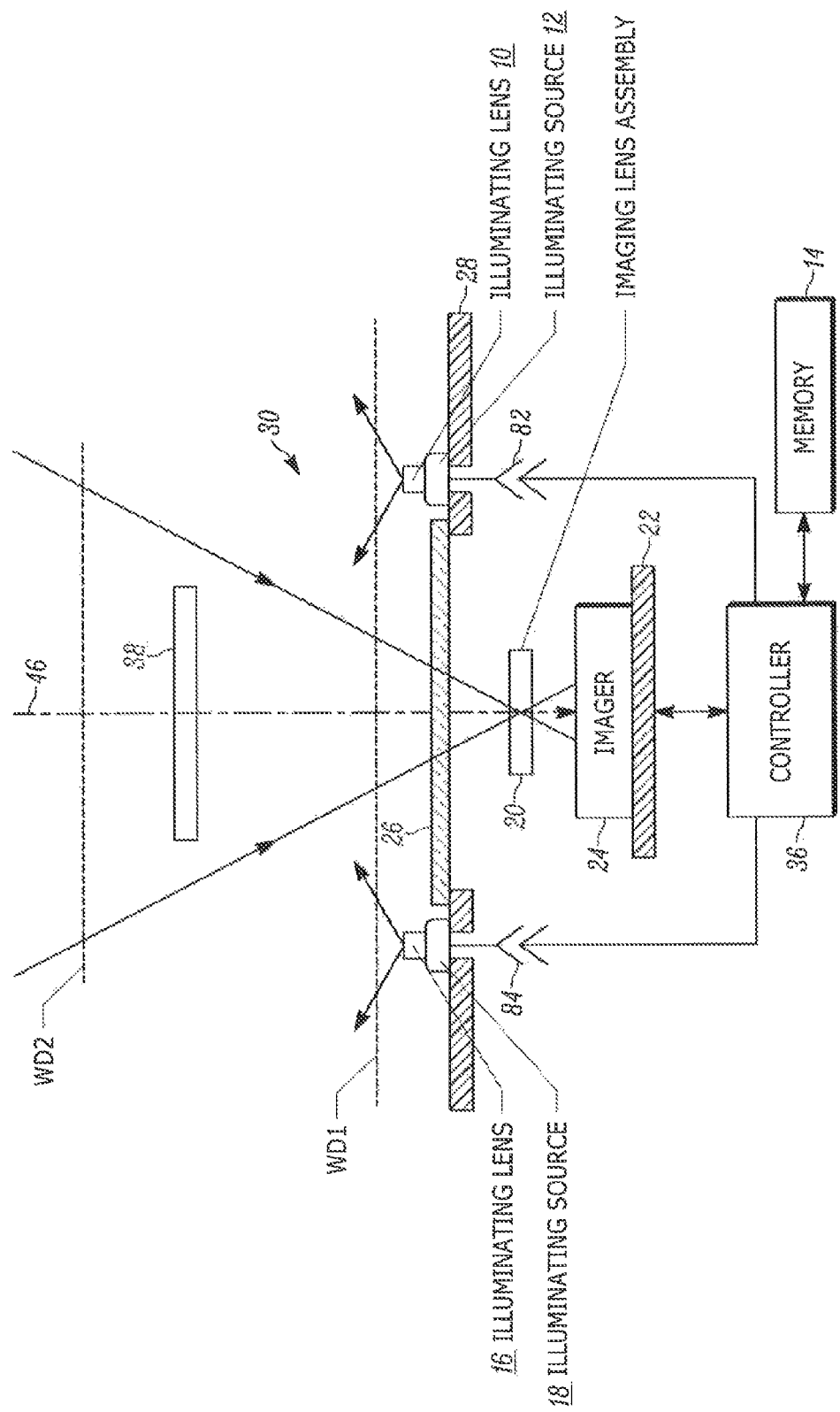
FIG. 2 is a schematic diagram of various components of the reader of FIG. 1.

As schematically shown in FIG. 2, an imager or imaging sensor 24 is mounted on a printed circuit board 22 in the reader 30. The imaging sensor 24 is a solid-state device, for example, a CCD or a CMOS imaging sensor having a one- or two-dimensional array of addressable image sensors or pixels, arranged in a single, linear, one-dimensional row, or in a plurality of mutually orthogonal rows and columns, preferably a megapixel array, and operative for detecting return light captured by an imaging lens assembly 20 along an optical path or optical axis 46 that extends through the window 26. The return light is scattered and/or reflected from a target, e.g., a DPM target or a symbol 38, as pixel data over a field of view. The imaging lens assembly 20 is operative for focusing and projecting the return light onto the array of image sensors to enable the target 38 to be read. The target 38 may be located anywhere in a range of working distances between a close-in working distance (WD1) and a far-out working distance (WD2). In a preferred embodiment, WD1 is about four to six inches from the imaging sensor 24, and WD2 can be many feet from the window 26, for example, around fifty or more feet away.

Interchangeable illumination modules 50, 52 (FIGS. 3-4), as described in detail below, are exteriorly mounted on the imaging reader 30, and each preferably includes, as shown in FIG. 2, an illuminator or illuminating light source 12, 18, e.g., one or more light emitting diodes (LEDs), and corresponding illuminating lenses 10, 16 to uniformly illuminate the target 38 over an illumination time period with an illuminating light having an optical characteristic, e.g., a predetermined color or wavelength, and/or a predetermined intensity level or brightness, and/or a predetermined illuminating pattern distribution or directionality, and/or a predetermined illumination angle, i.e., a wide or narrow illumination field, and/or a predetermined property, i.e., diffused or non-diffused light, etc. By interchanging one illumination module 50 for another illumination module 52, one or more desired optical characteristics are selected. More than two illumination modules can be employed, each with its own optical characteristic, or combination of optical characteristics. The light sources 12, 18 are preferably pulsed.

As also shown in FIG. 2, the imaging sensor 24 and the illuminating light sources 12, 18 are operatively connected to a controller or programmed microprocessor 36 operative for controlling the operation of these components by generating electrical command or control signals. Preferably, the microprocessor 36 is operative for processing the return light from the target 38, and for decoding the captured target image when the target 38 is a symbol. A memory 14 is accessible by the controller 36 for storing and retrieving data.

In operation, the controller 36 sends a command signal to pulse the illuminating light sources 12, 18 for the illumination time period, say 500 microseconds or less, and energizes and exposes the imaging sensor 24 to collect light, e.g., illumination light and/or ambient light, from the target 38 during an exposure time period. A typical array needs about 16-33 milliseconds to acquire the entire target image and operates at a frame rate of about 30-60 frames per second.

Figure 3:
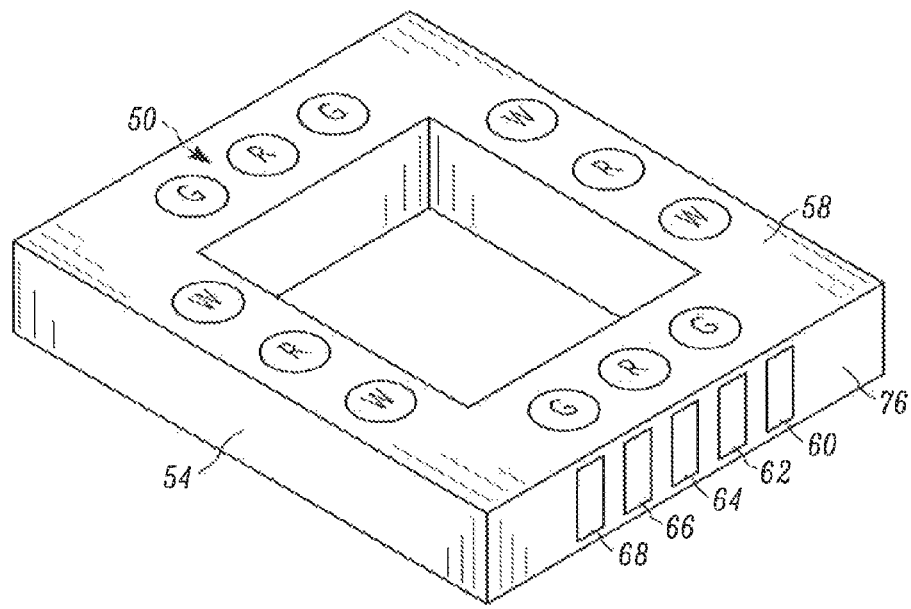
FIG. 3 is an enlarged, perspective view of one embodiment of an illumination module for use in the reader of FIG. 1.

As shown in FIG. 3, the illumination module 50 includes a four-sided, rectangular frame or support 54 for supporting the illuminating light sources 12, 18. As shown, the illuminating light source includes a first set of four LEDs for emitting an illuminating light with a red color and marked with the letter "R", a second set of four LEDs for emitting an illuminating light with a green color and marked with the letter "G", and a third set of four LEDs for emitting an illuminating light with a white color and marked with the letter "W". It will be understood that other colors could have been chosen, and all the sets could have the same color. The distribution and/or intensity and/or illumination angle and/or property of each set could be changed. The support 54 can have a shape other than the illustrated four-sided frame. For example, the support 54 can be a single linear bar, or a pair of parallel linear bars, or generally U-shaped with three sides, or shaped as an annular ring. The support 54 and its supported LEDs constitute a discrete unit that is jointly movable from a removed position away from the housing 28 to a mounted position on the housing, as shown in FIG. 1. Preferably, the support 54 seals its supported LEDs and their illumination lenses with an epoxy to protect against intrusion of dirt, dust, moisture and like contaminants.

Figure 4:
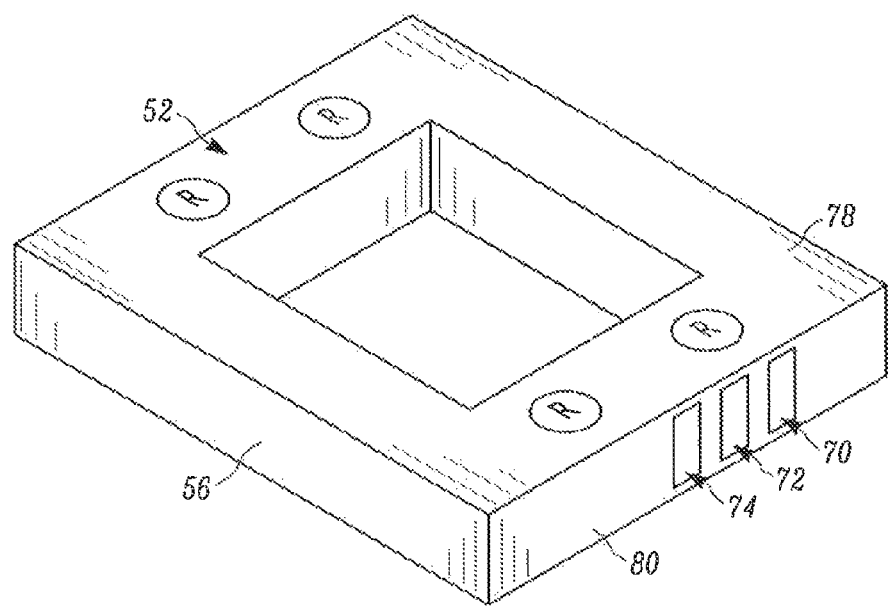
FIG. 4 is an enlarged, perspective view of another embodiment of an illumination module for use in the reader of FIG. 1.

As shown in FIG. 4, the illumination module 52 includes a four-sided, rectangular frame or support 56 for supporting the illuminating light sources 12, 18. As shown, the illuminating light source includes a set of four LEDs for emitting an illuminating light with the same red color and marked with the letter "R". Thus, if red illuminating light is desired for a particular application, then the illumination module 52 would be mounted on the reader. If another color is desired, then the illumination module 52 would be removed from the reader and replaced by another illumination module, for example, by the illumination module 50. If a different illumination light pattern distribution is desired, e.g., an annular ring of multiple LEDs, or a pair of spotlight LEDS, or if a wide or narrow illumination field is desired, or if diffused or non-diffused illumination light is desired when reading DPM targets, then the appropriate illumination module would be selected.

Returning to FIG. 3, a plurality of electrical contacts 60, 62, 64, 66, and 68 are provided on the support 54 and exposed exteriorly of the support 54 for supplying at least one electrical illumination control signal, and preferably a plurality of such control signals, from the controller 36 to the illuminating light source to energize the illuminating light source in the mounted position. Power contact 60 supplies power; ground contact 62 supplies ground; control contact 64 supplies a first control signal for the first set of red LEDs; control contact 66 supplies a second control signal for the second set of green LEDs; and control contact 68 supplies a third control signal for the third set of white LEDs. The controller 36 generates a plurality of electrical illumination control signals, one control signal for each set of LEDs, and thereby individually controls the color of the illuminating light. The support 54 has a generally planar front wall 58 through which the illuminating light passes to the target 38, and a generally planar side wall 76 that is generally perpendicular to the front wall 58. The electrical contacts 60, 62, 64, 66, and 68 have generally planar faces flush, and substantially coplanar, with the side wall 76.

Analogously, in FIG. 4, a plurality of electrical contacts 70, 72, and 74 are provided on the support 56 and exposed exteriorly of the support 56 for supplying an electrical illumination control signal from the controller 36 to the illuminating light source to energize the illuminating light source in the mounted position. Power contact 70 supplies power; ground contact 72 supplies ground; and control contact 74 supplies a control signal for the set of red LEDs. The support 56 has a generally planar front wall 78 through which the illuminating light passes to the target 38, and a generally planar side wall 80 that is generally perpendicular to the front wall 78. The electrical contacts 70, 72, and 74 have generally planar faces flush, and substantially coplanar, with the side wall 80.

Figure 5:
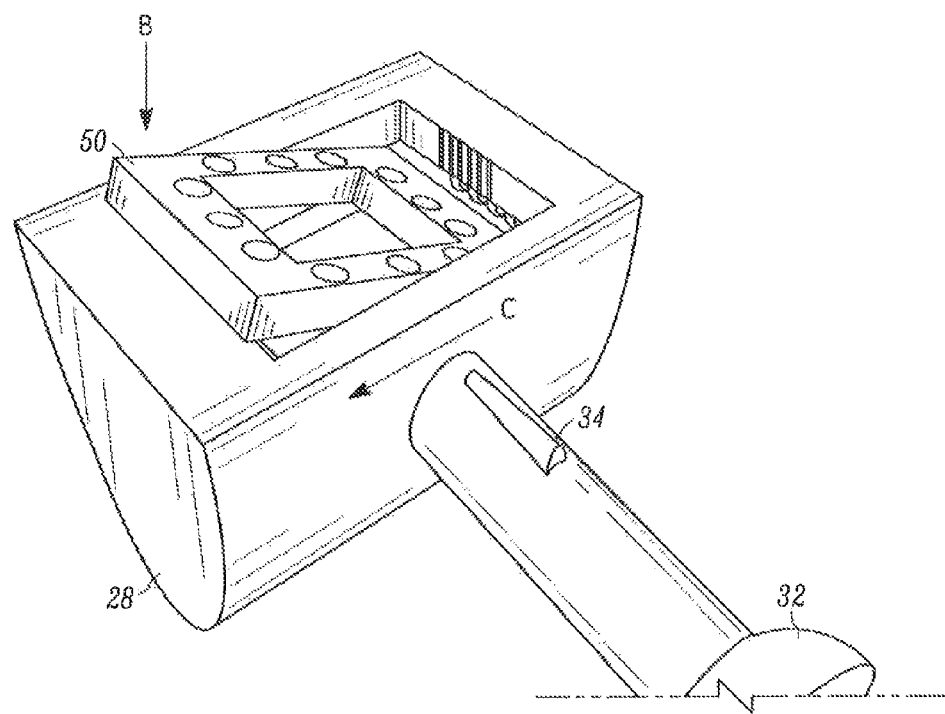
FIG. 5 is a broken-away, perspective view of the illumination module of FIG. 3 during mounting on the reader of FIG. 1.
Figure 6:
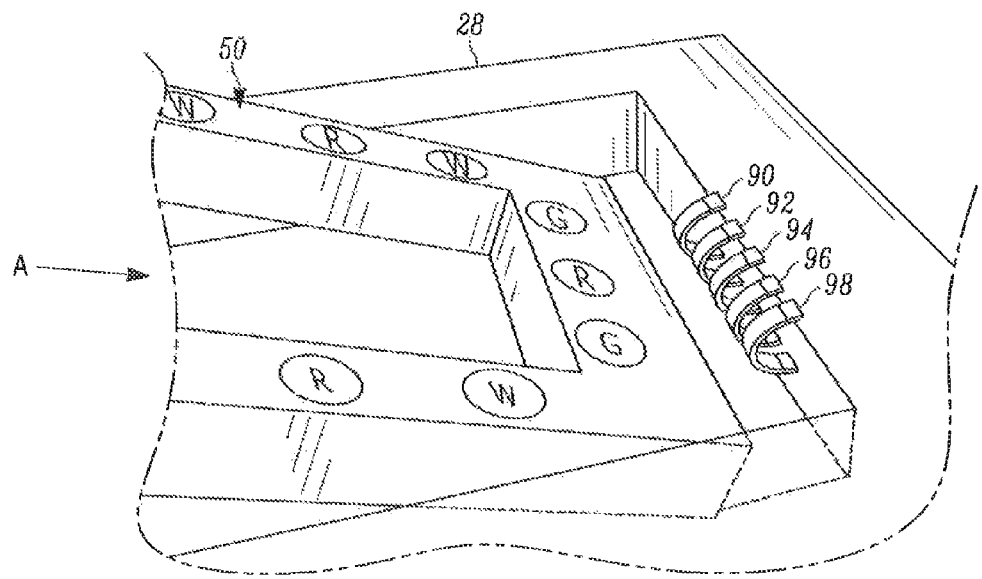
FIG. 6 is a broken-away, enlarged, perspective, close-up view of FIG. 5.

FIG. 5-6 depict how the illumination module 50 is mounted on the reader 30. The illumination module 50 is tilted and initially moved in the direction of arrow A (FIG. 6), and then moved in the direction of arrow B (FIG. 5). During this movement, the exposed contacts 60, 62, 64, 66, and 68 on the illumination module 50 are pressed against a corresponding plurality of exposed housing contacts 90, 92, 94, 96, and 98 (see FIG. 6), which are advantageously configured as resilient spring fingers, to make an electromechanical connection therewith. The spring fingers are the terminal ends of an electrical connector 82, 84, as diagrammatically illustrated in FIG. 2, which extends from the controller 36 in the interior of the housing 28 to the illuminating sources 12, 18 of the illuminating module 50 at the exterior of the housing 28. The spring fingers exert a restoring force to push the illumination module 50 in the direction of the arrow C in FIG. 5, thereby securely holding the illumination module 50 in place. In the mounted position, the illumination module 50 lays outside the window 26, and the support 54 extends around the imager 24 about the optical axis 46.

The illumination module 50 can be removed from the reader 30 by reversing the above movement, that is, by sliding the illumination module 50 against the spring fingers in the direction opposite to arrow C, by tilting the illumination module upwardly in the direction opposite to arrow B, and by withdrawing the illumination module 50 in the direction opposite to arrow A. Removal is facilitated due to the fact that the illumination module 50 is accessible exteriorly of the housing in the mounted position. This enables an operator of the reader 30 to remove and replace the illumination module 50 in situ and without having to return the reader back to the manufacturer for a retrofit.

Figure 7:
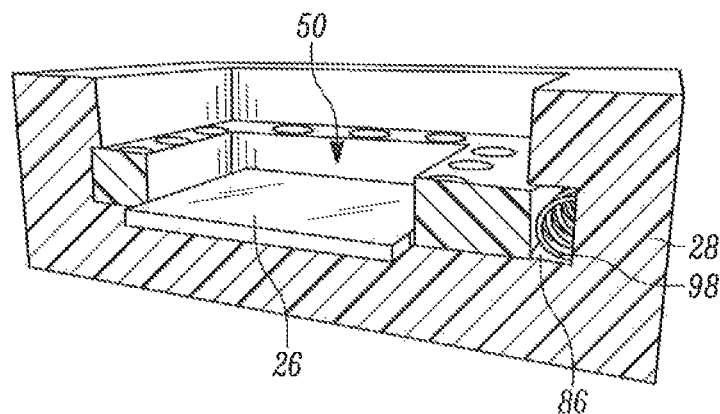
FIG. 7 is a broken-away, perspective view of the illumination module of FIG. 3 mounted in an undercut channel of a housing of the reader of FIG. 1.
Figure 8:
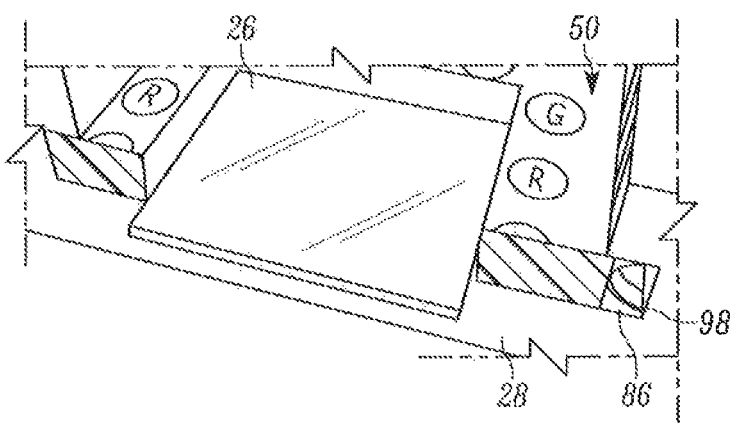
FIG. 8 is a broken-away, perspective view of FIG. 7 as seen from above.

For an even greater securement of the illumination module 50, the housing 28 can be provided with an undercut channel 86, as shown in FIGS. 7-8. The spring fingers are advantageously located in the channel 86, and the illumination module 50 is received and mechanically held in the channel 86 by the spring fingers in the mounted position. The channel 86 helps prevent the illuminating module from detaching from the reader in the event of a sudden impact.

The discrete illumination modules 50, 52 proposed herein are separate from the scan module mounted inside the housing 28. This allows the scan module to be smaller in volume, lighter in weight, and less expensive in cost. The scan module also has less heat to be dissipated, no internal light reflections, less electrical noise, and is less complex than the known scan modules.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An illumination module for illuminating a target to be electro-optically imaged and read by an imaging reader, the illumination module comprising:
   an energizable illuminating light source for emitting illuminating light when energized;
   a support for supporting the illuminating light source for joint movement as a discrete unit from a removed position away from the reader to a mounted position on the reader, the support being accessible exteriorly of the reader in the mounted position;
   a plurality of electrical contacts on the support and exposed exteriorly of the support for supplying an electrical illumination control signal from the reader to the illuminating light source to energize the illuminating light source in the mounted position;
   wherein the support has a generally planar front wall through which the illuminating light passes to the target, and a generally planar side wall that is generally perpendicular to the front wall, and wherein the electrical contacts have generally planar faces flush, and substantially coplanar, with the side wall; and
   an opening surrounded by the generally planar front wall for exposing an imaging assembly, wherein the illuminating light source includes a plurality of different types of light emitting diodes generating illumination light through exposed positions on the generally planar front wall with the exposed positions distributed across the opening.

2. The illumination module of claim 1, wherein the plurality of different types of light emitting diodes is configured for emitting the illuminating light with different selected optical characteristics, one optical characteristic for each type.

3. The illumination module of claim 1, wherein the support is a rectangular frame.

4. An arrangement for illuminating and electro-optically reading a target by image capture, the arrangement comprising:
   a housing bounding an interior;
   an imaging assembly in the housing interior for imaging the target;
   a controller in the housing interior for controlling the imaging assembly and for generating an electrical illumination control signal;
   an illumination module for illuminating the target, the illumination module including an energizable illuminating light source for emitting illuminating light when energized, a support for supporting the illuminating light source for joint movement as a discrete unit from a removed position away from the housing to a mounted position on the housing, the support being accessible exteriorly of the housing in the mounted position, and a plurality of electrical contacts on the support and exposed exteriorly of the support for supplying the electrical illumination control signal from the controller to the illuminating light source to energize the illuminating light source in the mounted position;
   wherein the support has a generally planar front wall through which the illuminating light passes to the target, and a generally planar side wall that is generally perpendicular to the front wall, and wherein the electrical contacts have generally planar faces flush, and substantially coplanar, with the side wall; and an opening surrounded by the generally planar front wall for exposing an imaging assembly, wherein the illuminating light source includes a plurality of different types of light emitting diodes generating illumination light through exposed positions on the generally planar front wall with the exposed positions distributed across the opening.

5. The arrangement of claim 4, wherein the plurality of different types of light emitting diodes is configured for emitting the illuminating light with different selected optical characteristics, one optical characteristic for each type, and wherein the controller generates a plurality of electrical illumination control signals, one control signal for each type.

6. The arrangement of claim 4, and another illumination module for interchanging with the first-mentioned module, the other illumination module including another energizable illuminating light source for emitting another illuminating light of a different optical characteristic than the first-mentioned illuminating light when energized, another support for supporting the other illuminating light source for joint movement as a discrete unit from the removed position to the mounted position, the other support being accessible exteriorly of the housing in the mounted position, and another plurality of electrical contacts on the other support and exposed exteriorly of the other support for supplying another electrical illumination control signal from the controller to the other illuminating light source to energize the other illuminating light source in the mounted position.

7. The arrangement of claim 4, wherein the housing has an electrical connector that extends from the housing interior to an exterior of the housing and terminates in a plurality of housing contacts that electrically mate with the contacts of the support in the mounted position.

8. The arrangement of claim 7, wherein the housing has an undercut channel, wherein the housing contacts are spring finger contacts located in the channel, and wherein the illumination module is received and mechanically held in the channel by the spring finger contacts in the mounted position.

9. The arrangement of claim 4, wherein the housing has a light-transmissive window, wherein the imaging assembly captures return light along an optical axis from the illuminated target through the window over a field of view of an array of image sensors of a solid-state imager, wherein the illumination module overlies the window in the mounted position, and wherein the support is a frame that extends around the imager about the optical axis.

10. A method of illuminating and electro-optically reading a target by image capture, the method comprising:

mounting an imaging assembly for imaging the target in an interior of a housing;

configuring an illumination module as a discrete unit by jointly mounting an energizable illuminating light source on a support;

moving the illumination module from a removed position away from the housing to a mounted position on the housing, the support being accessible exteriorly of the housing in the mounted position, wherein the support has a generally planar front wall through which illuminating light passes to the target, and a generally planar side wall that is generally perpendicular to the front wall, and wherein the electrical contacts have generally planar faces flush, and substantially coplanar, with the side wall;

exposing the imaging assembly through an opening surrounded by the generally planar front wall, wherein the illuminating light source includes a plurality of different types of light emitting diodes generating the illumination light through exposed positions on the generally planar front wall with the exposed positions distributed across the opening;

exposing a plurality of electrical contacts exteriorly of the support; and energizing the illuminating light source in the mounted position via the exposed electrical contacts to illuminate the target with illuminating light.

11. The method of claim 10, and configuring the plurality of different types of light emitting diodes for emitting the illuminating light with different selected optical characteristics, one optical characteristic for each type, and selecting the optical characteristic of the type to be energized.

12. The method of claim 10, and interchanging the first-mentioned module with another illumination module operative for emitting another illuminating light of a different optical characteristic than the first-mentioned illuminating light when energized.

13. The method of claim 10, and configuring an electrical connector to extend from the housing interior to an exterior of the housing, and terminating the connector in a plurality of housing contacts that electrically mate with the contacts of the support in the mounted position.

14. The method of claim 10, and configuring the housing with an undercut channel, locating the housing contacts in the channel, and receiving and mechanically holding the illumination module in the channel in the mounted position.

* * * * *